United States Patent [19]

Beck

[11] 4,190,130
[45] Feb. 26, 1980

[54] DUAL STEERING SYSTEM FOR OFF-HIGHWAY VEHICLES

[75] Inventor: Earl Beck, Springdale, Ark.

[73] Assignee: Unit Rig & Equipment Co., Tulsa, Okla.

[21] Appl. No.: 941,023

[22] Filed: Sep. 11, 1978

[51] Int. Cl.² ............................................. B62D 5/06
[52] U.S. Cl. ...................................... 180/133; 60/405
[58] Field of Search ........................ 180/133, 152, 153; 60/405, 404, 403

[56] References Cited

U.S. PATENT DOCUMENTS

| | | | |
|---|---|---|---|
| 3,083,533 | 4/1963 | Schenkelberger | 60/405 |
| 3,905,438 | 9/1975 | Runyon et al. | 180/133 |
| 4,114,720 | 9/1978 | Ericson et al. | 180/133 |

Primary Examiner—John A. Pekar
Attorney, Agent, or Firm—William S. Dorman

[57] ABSTRACT

A dual vehicular steering system with a primary system for normal operation and a secondary system for emergency operation triggered by pressure sensitive switching and valving means. Both systems have in common a pair of single rod hydraulic steering cylinders with each cylinder being connected to a steerable wheel of the vehicle, a vehicular engine and hydraulic fluid stored in a tank. Cylinder shuttle valves connected to each steering cylinder function as gate devices to separate the primary steering system from the secondary system. The primary system includes a main pump driven by the engine, a high pressure filter, a priority flow divider to divert fluid in excess of an acceptable flow level, a control valve, an integrated valve package to proportionately regulate fluid flow between the cylinders, and means to direct fluid from the tank to the pump, through the filter, through the priority flow divider, through the control valve, through the integrated valve package and to the steering cylinders. The secondary system includes a secondary pump, an electric motor driven by the battery to drive the secondary pump, and means to conduct fluid from the secondary pump, through the switching and valving means and to the steering cylinders. The secondary system also includes an accumulator, pressure sensitive switching and valving means to conduct fluid from the secondary pump to the accumulator, and means to conduct fluid from the accumulator to the steering cylinders. Steering in the secondary system is accomplished by applying equal pressure to both ends of each steering cylinder thereby locking the cylinders in a single mode and by selectively draining fluid from selected ends of the steering cylinders. Operator controlled secondary steering switch and valve means operate the selective drain means.

5 Claims, 2 Drawing Figures

DUAL STEERING SYSTEM FOR OFF-HIGHWAY VEHICLES

BACKGROUND OF THE INVENTION

1. Field of the Invention

This invention relates to a dual steering system for off-highway vehicles containing both a primary steering system for normal operation and a secondary steering system for emergency operation. More particularly, this invention relates to a totally divided steering system from the steering cylinders outward such that, despite a malfunction of any single component in one part of the system, adequate control can be maintained by the unaffected parts of the system.

2. Description of the Prior Art

Vehicular steering in large, off-highway vehicles is normally accomplished through a hydraulic steering system connected to the front wheels. Failure of the hydraulic pump or failure of the engine to operate can affect the steering. An obvious safety problem can arise from the loss of steering in these large vehicles. Hydraulic steering systems of this type are dependent upon operation of the vehicle engine for power to operate the system. The steering may also be disrupted by hydraulic failure due to broken hydraulic or fittings or leaks in the system.

Therefore, it is a principal object and purpose of this invention to provide a fully redundant steering system including a primary steering system for control of steering in normal operation and a secondary system capable of operating despite the total failure of any of the major components of the primary system. It is also a principal object and purpose of this invention to utilize a pair of steering cylinders common to both the primary and secondary system and to have either system provide steering control despite loss or malfunction of one cylinder. It is a further object and purpose to utilize the concept of proportional flow dividers to compensate for the difference in area at the opposite ends of a hydraulic cylinder.

SUMMARY OF THE INVENTION

The present invention provides a dual steering system for off-highway vehicles with both a primary steering system and a secondary steering system. The vehicle would be steered through use of a pair of single rod steering cylinders which are common to both systems and which are connected to the front wheels of the vehicle.

A control valve regulates the flow of hydraulic fluid to the steering cylinders. Fluid flow from the control valve to the steering cylinders is regulated through use of proportional flow dividers. Th proportional flow dividers and a pair of cross-over reliefs make up an integrated valve package.

During the normal operation, pressurized hydraulic fluid is directed to the valve from the main pump which is driven by the engine of the vehicle. The main pump draws fluid from a conventional tank. Any hydraulic fluid flow in excess of an acceptable level is diverted by means of a priority flow divider.

If fluid flow from the pump falls below the acceptable level, a flow switch actuates a solenoid operated selector valve. This selector valve serves as the separating device between the primary and the secondary pumping system. Simultaneously, an emergency steering pump is actuated and driven electrically by a motor. Pressurized hydraulic fluid from the emergency pump is directed through the selector valve to the control valve thereby providing sufficient hydraulic fluid flow for adequate steering.

A steering switch, such as a three-position, spring centered electrical switch, comprises an auxiliary steering lever. Upon actuation of the steering switch, a solenoid operated four-way valve is energized and is locked into the actuated state by means of a reset-type switch.

Upon actuation, the four-way valve directs pilot pressure to a pilot control check valve thereby directing all fluid flow from the main pump to a reservoir. Simultaneously, actuation of the selector valves is disabled. Actuation of the four-way valve directs pilot pressure to a pilot operated check valve. This check valve directs pressurized hydraulic fluid from an accumulator to opposite ends of the steering cylinders.

An accumulator switch is responsive to the pressure within the accumulator. When the pressure falls below a predetermined level, the accumulator switch actuates the emergency pump to recharge the accumulator, thus eliminating constant running of the emergency pump.

The steering switch also controls the operation of a solenoid actuated valve. Upon actuation the valve directs pilot pressure to either one of a pair of discharge valves. These discharge valves correspond to the steering cylinders and upon actuation function to drain hydraulic fluid from the opposite end thereof. Thus, the steering switch effects the steering of the vehicle even though the control valve or any line extending therefrom to the steering cylinders is completely disabled.

Fluid flow out of the cylinders under the action of the discharge valves is through a plurality of pressure compensated flow control valves sized to correspond to the difference in area between the opposite ends of each of the cylinders.

DETAILED DESCRIPTION OF THE PREFERRED EMBODIMENTS

Figure 1:
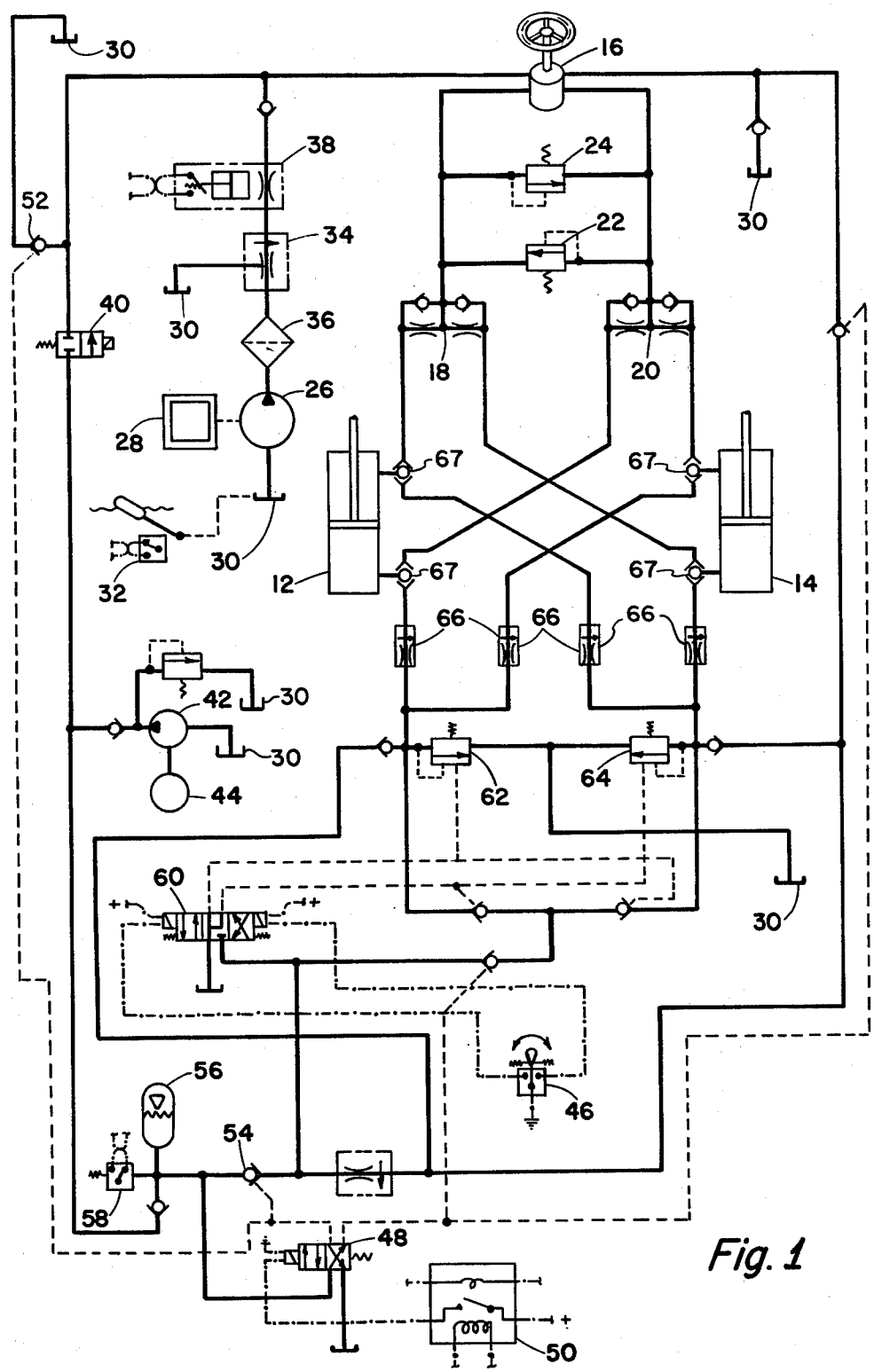
FIG. 1 is a schematic diagram of a dual steering system for off-highway vehicles as embodied in the present invention.

As shown in FIG. 1, a schematic diagram of a dual steering system for off-highway vehicles comprises a fully redundant steering system consisting of a primary system that controls steering in normal operation and a secondary system which is capable of operating notwithstanding the total failure of any of the major components of the primary system. The vehicle 10 (not shown in FIG. 1) is steered through use of a pair of steering cylinders 12 and 14. These are conventional, single rod steering cylinders. Each of the steering cylinders 12 and 14 is capable of steering the vehicle notwithstanding the complete failure of the other steering cylinder. The cylinders are conventional units of extra heavy duty design of a size that one cylinder alone would be able to control the truck in an emergency situation.

Hydraulic fluid flow to the steering cylinders is regulated by a control valve 16. The solid lines in FIG. 1 represent the flow of fluid in the primary system. Fluid flow from the control valve 16 to the steering cylinders 12 and 14 is regulated by means of proportional flow dividers 18 and 20.

The proportional flow dividers and a pair of crossover reliefs or cushion valves 22 and 24 make up an integrated valve package. The cushion valves 22 and 24 prevent shock loads from being transferred to the steering cylinders, for instance, if a bump is hit by a vehicle. The difference in rates of flow through the two sides of the proportional flow dividers is in accordance with the difference in area between the rod ends and blind ends of the cylinders.

During normal operation, pressurized hydraulic fluid (not shown) is directed to the valve 16 from a main pump 26 which is driven by the engine of the vehicle 28. The main pump draws fluid from a conventional tank 30. The main pump 26 provides a certain number of gallons per minute fluid flow at idle and a greater number of gallons per minute fluid flow at full engine speed. In the present embodiment, for instance, 9.46 liters per minute of fluid flows at idle and 18.45 liters per minute of fluid flow at full engine speed.

Any hydraulic fluid flow in excess of an acceptable level, here 40 gallons per minute, is diverted by means of a priority flow divider 34. A high pressure filter 38 located between the main pump 26 and the flow dividers 30 is an optional feature desirable for maintenance of the system.

If fluid flow from the pump 26 falls below the acceptable level, a flow switch 38 actuates a solenoid operated selector valve 40. The fluid flow from the pump may fall below the acceptable level for a variety of reasons. This selector valve serves as the separating device between the primary and the secondary system. Simultaneously, an emergency steering pump 42 is actuated and driven electrically by a motor 44. Pressurized hydraulic fluid from the emergency pump 42 is directed through the selector valve 40 to the control valve 16, thereby providing adequate hydraulic fluid flow to effect steering.

A steering switch 46 comprises an auxiliary steering lever. This steering switch would be located in the cab of the vehicle (not shown in FIG. 1). This steering switch may, for example, be a three-position, spring centered electrical switch. Upon actuation of the steering switch a solenoid operated four-way valve 48 is energized and is locked in the actuated state by means of a reset-type switch 50. This reset switch would also be wired to the cab of the vehicle.

Upon actuation, the four-way valve 48 directs pilot pressure to a pilot controlled check valve 52 thereby directing all fluid flow from the main pump 26 to the tank 30. Simultaneously actuation of the selector valve 40 is disabled. Actuation of the four-way valve 48 directs pilot pressure to a pilot operated check valve 54. This check valve directs pressurized hydraulic fluid from an accumulator 56 to both blind ends and rod ends of the steering cylinders 12 and 14. At this point, the steering system is locked in its last operating mode prior to actuation of the steering switch 46.

An accumulator switch 58 responsive to the pressure within the accumulator 56. When such pressure falls below a predetermined level, the accumulator switch 58 actuates the emergency pump 42 to recharge the accumulator. This eliminates constant running of the emergency pump, thereby eliminating discharge of the battery of the vehicle. The accumulator circuit, however, maintains a full charge of pressure loaded fluid for instantaneous supply to the secondary system.

The steering switch 46 also controls the operation of a solenoid actuated valve 60. Upon actuation, the valve 60 directs pilot pressure to either one of a pair of discharge valves 62 and 64. These discharge valves correspond to the steering cylinders and upon actuation function to drain hydraulic fluid from the opposite ends thereof. In this manner, the steering switch 45 affects the steering of the vehicle even though the control valve 16 or any line extending therefrom to the steering cylinders 12 or 14 is completely disabled. This condition might occur, for instance, due to rupture. The secondary system is not a modulated steering system and would be tiresome and undesirable for continuous steering but it does provide complete positive control, without wander or overrun.

Fluid flow out of the cylinders under the action of the discharge valves 62 and 64 is through a plurality of pressure compensated flow control valves 66 sized to correspond to the difference in area between the rod ends and the blind ends of the cylinders 12 and 14.

A cylinder shuttle valve 67 is connected to each end of each steering cylinder 12 and 14. The cylinder shuttle valves are the switching gates devices that provide the points of separation between the primary system and the secondary system. The basic split of the two systems occurs at the shuttle valves since the steering cylinders 12 and 14 are common to both systems.

The secondary system then, is an inverse, or pressure loaded design that, once engaged, maintains a balanced pressure load on each cylinder. The steering cylinders are also fluid locked in position. The net result is a closed center, non-loaded reaction circuit.

Thus it can be seen that the hydraulic steering cylinders 12 and 14 are common to both the primary and secondary systems and either system will provide steering control despite loss, or malfunction of one cylinder.

Figure 2:
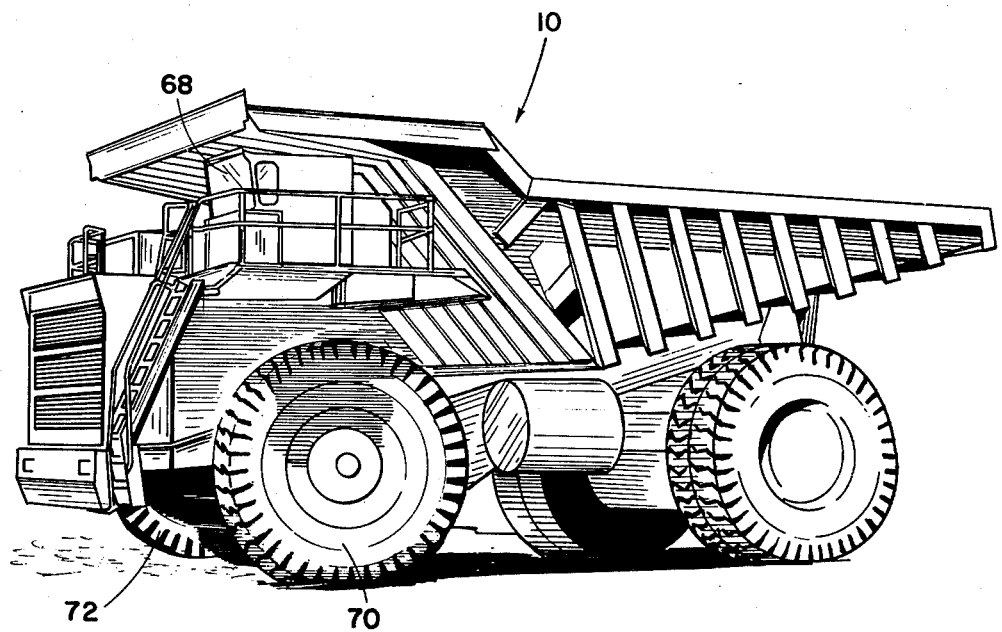
FIG. 2 is a perspective view of a typical off-highway vehicle wherein the present invention would be utilized.

FIG. 2 illustrates a typical off-highway vehicle 10, such as a mining truck, wherein the present invention would be utilized. Not only the primary steering system controls, but the steering switch 46 for the secondary system as well, would be located in the cab 68 of the vehicle. Normally, the steering cylinders 12 and 14 would be connected to the front wheels 70 and 72 of the vehicle, as these would be the steerable wheels.

Whereas, the present invention has been described in particular relation with the drawings attached hereto, it should be understood that other and further modifications, apart from those shown or suggested herein, may be made within the spirit and scope of this invention.

What is claimed is:

1. Dual vehicular steering apparatus with a primary steering system for normal operation and a secondary system for emergency operation triggered by pressure sensitive switching and valving means wherein both systems have in a common a pair of single rod hydraulic steering cylinders, each cylinder being connected to a steerable wheel of the vehicle and being capable of steering the vehicle despite complete failure of the other steering cylinder; engine means to power said vehicle; hydraulic fluid stored in a tank; cylinder shuttle valve means for each steering cylinder to separate said primary system from said secondary system; and means for conducting said fluid from said cylinder shuttle valve means to said steering cylinders and wherein said primary system comprises main pump means driven by said vehicle engine to maintain an acceptable level of pressure in said primary system; a high pressure filter; means for conducting fluid from said pump to said filter where said fluid is filtered; a priority flow divider to divert said fluid in excess of an acceptable pressure level; means for conducting said fluid from said filter to said priority flow divider; a control valve to regulate the flow of said fluid; means to conduct fluid from said priority flow divider to said control valve; integrated valving means to proportionately regulate fluid flow between said cylinders; means for conducting said fluid from said control valve to said proportional valve means; and means to conduct said fluid from said proportional valve package to said cylinder shuttle valve means; and wherein said secondary system comprises secondary steering pump means; electric motor means driven by the vehicular battery to drive said secondary pump; means to conduct said fluid from said secondary pump means through said switching and valving means and to said cylinder shuttle valve means; an accumulator; pressure sensitive switching and valving means to conduct said fluid from said secondary pump to said accumulator; means to conduct said fluid from said accumulator to said cylinder shuttle valve; means to apply equal pressure to both ends of each steering cylinder thereby locking said steering cylinders in a single operating mode; means to selectively drain fluid from selected ends of said steering cylinders to effect steering; and operator controlled secondary steering switch and valve means to operate said fluid drain means.

2. Apparatus for vehicular steering as set forth in claim 1 wherein said integrated valving means included a pair of proportional flow dividers and a plurality of cross-over relief valves arranged such that the difference in rates of fluid flow through the flow dividers is in accordance with the difference in area between opposite ends of each cylinder.

3. Apparatus for vehicular steering as set forth in claim 1 wherein said pressure sensitive switching and valving means for triggering operation of said secondary system includes a flow switch and a solenoid operated selector valve.

4. Apparatus for vehicular steering as set forth in claim 1 wherein said means to apply equal pressure to both ends of each steering cylinder includes a solenoid operated four-way valve, a reset-type switch to lock said four-way valve in the actuated state, a pilot controlled check valve, means to direct pilot pressure to said pilot controlled check valve, means to direct fluid flow from said main pump to said tank, a pilot operated check valve, means to direct fluid from said four-way valve to said pilot operated check valve, and means to direct fluid from said accumulator to opposite ends of each cylinder.

5. Apparatus for vehicular steering as set forth in claim 1 wherein said selective drain means includes solenoid actuated valve means, discharge valve means corresponding to said steering cylinders, and a plurality of pressure compensated flow control valve means.

* * * * *